United States Patent
Wolf et al.

(10) Patent No.: US 10,509,646 B2
(45) Date of Patent: Dec. 17, 2019

(54) SOFTWARE UPDATE ROLLBACKS USING FILE SYSTEM VOLUME SNAPSHOTS

(71) Applicant: Apple Inc., Cupertino, CA (US)

(72) Inventors: Christopher A. Wolf, Bahama, NC (US); Jack R. Matthew, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/720,203

(22) Filed: Sep. 29, 2017

(65) Prior Publication Data

US 2018/0349133 A1 Dec. 6, 2018

Related U.S. Application Data

(60) Provisional application No. 62/514,726, filed on Jun. 2, 2017.

(51) Int. Cl.
| | | |
|---|---|---|
| G06F 9/44 | (2018.01) | |
| G06F 8/71 | (2018.01) | |
| G06F 8/73 | (2018.01) | |
| G06F 8/65 | (2018.01) | |
| G06F 16/23 | (2019.01) | |
| G06F 16/16 | (2019.01) | |
| G06F 16/11 | (2019.01) | |
| G06F 9/4401 | (2018.01) | |

(52) U.S. Cl.
CPC .................. *G06F 8/71* (2013.01); *G06F 8/65* (2013.01); *G06F 8/73* (2013.01); *G06F 16/11* (2019.01); *G06F 16/162* (2019.01); *G06F 16/2379* (2019.01); *G06F 9/4411* (2013.01)

(58) Field of Classification Search
CPC ........................................................ G06F 8/71
See application file for complete search history.

(56) References Cited

U.S. PATENT DOCUMENTS

| | | |
|---|---|---|
| 6,334,149 B1 | 12/2001 | Davis, Jr. et al. |
| 6,438,749 B1 | 8/2002 | Chamberlain |
| 7,467,378 B1 | 12/2008 | Sobel |
| 7,608,301 B2 | 10/2009 | Bacos et al. |
| 7,681,011 B1 * | 3/2010 | Shmuylovich ...... H04L 67/1097 711/114 |
| 8,332,842 B2 | 12/2012 | Bauer et al. |
| 8,815,342 B2 | 8/2014 | Menuey et al. |
| 8,821,707 B2 | 9/2014 | Inoue et al. |
| 9,081,964 B2 | 7/2015 | Liu et al. |
| 2004/0153724 A1 | 8/2004 | Nicholson et al. |

(Continued)

*Primary Examiner* — Hang Pan
(74) *Attorney, Agent, or Firm* — Dickinson Wright RLLP

(57) ABSTRACT

The embodiments set forth a technique for restoring a computing device to an operable state when a software update renders the computing device inoperable. According to some embodiments, a snapshot of a file system volume is automatically generated prior to executing the software update. When an issue is detected with the software update—e.g., the computing device freezes, the computing device cannot boot into an operable mode, etc.—the computing device can (1) automatically enter into a restoration mode, and (2) restore the file system volume to its previous state in accordance with the snapshot. In this manner, the issues caused by the software update are entirely mitigated, and the computing device can transition back into an operable state.

20 Claims, 9 Drawing Sheets

(56) References Cited

U.S. PATENT DOCUMENTS

| | | |
|---|---|---|
| 2005/0060607 A1 | 3/2005 | Kano |
| 2005/0132351 A1 | 6/2005 | Randall et al. |
| 2005/0165862 A1 | 7/2005 | Loafman et al. |
| 2007/0162732 A1* | 7/2007 | Diwan ................ G06F 11/3419 713/1 |
| 2008/0016572 A1 | 1/2008 | Burkhardt et al. |
| 2009/0217255 A1* | 8/2009 | Troan ........................ G06F 8/65 717/168 |
| 2009/0222496 A1 | 9/2009 | Liu et al. |
| 2010/0285322 A1 | 11/2010 | Inoue et al. |
| 2011/0214021 A1* | 9/2011 | Vidal ........................ G06F 8/65 714/38.1 |
| 2012/0278892 A1* | 11/2012 | Turbin .................... G06F 21/53 726/24 |

* cited by examiner

SOFTWARE UPDATE ROLLBACKS USING FILE SYSTEM VOLUME SNAPSHOTS

CROSS-REFERENCE TO RELATED APPLICATIONS

The present application claims the benefit of U.S. Provisional Application No. 62/514,726, entitled "SOFTWARE UPDATE ROLLBACKS USING FILE SYSTEM VOLUME SNAPSHOTS," filed Jun. 2, 2017, the content of which is incorporated herein by reference in its entirety for all purposes.

FIELD

The described embodiments relate generally to managing software updates at a computing device. More particularly, the described embodiments relate to utilizing file system volume snapshots and operability monitors to restore stability to the computing device when a software update renders the computing device inoperable.

BACKGROUND

Existing approaches for performing software updates—e.g., operating system (OS) updates—can be task-intensive and prone to error. For example, a common approach for updating an OS of a computing device can involve the following steps: (1) receiving an OS update package at the computing device, (2) unpacking the OS update package, (3) performing the update (in accordance with the OS update package) to produce an updated OS, and (4) rebooting the computing device/loading the updated OS. Unfortunately, when step (3) is carried out, the computing device enters into a vulnerable state where particular events can potentially render the computing device inoperable, e.g., when a power failure occurs, when the software update fails, and so on.

Accordingly, there exists a need for a more efficient and stable technique for managing software updates on computing devices.

SUMMARY

Representative embodiments set forth herein disclose various techniques for managing software updates at a computing device. More particularly, the described embodiments involve utilizing file system volume snapshots and operability monitors to restore stability to the computing device when a software update renders the computing device inoperable.

According to some embodiments, a method for restoring a computing device to an operable state when a software update renders the computing device inoperable can include the steps of (1) receiving a request to install the software update, (2) prior to installing the software update, generating a snapshot of a file system volume mounted on the computing device, (3) installing the software update, and (4) in response to determining that installing the software update renders the computing device inoperable: restoring the file system volume based on the snapshot.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
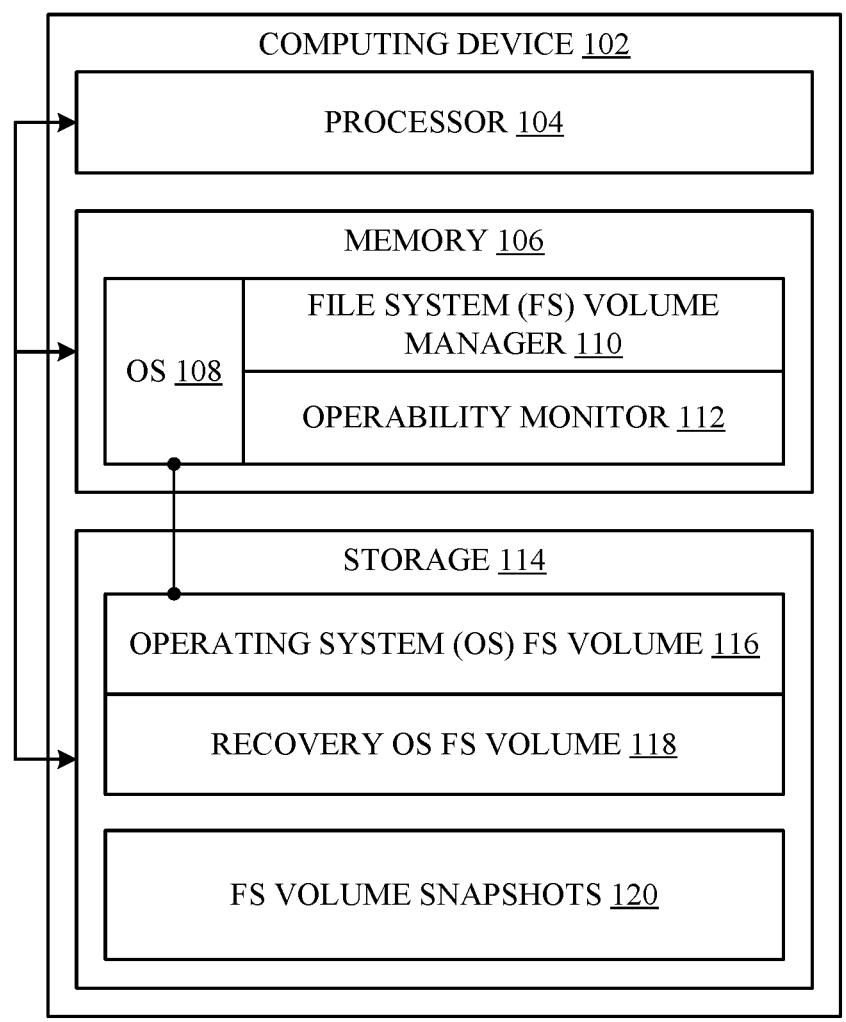
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for managing software updates at a computing device. More particularly, the described embodiments involve utilizing file system volume snapshots and operability monitors to restore stability to the computing device when a software update renders the computing device inoperable.

According to some embodiments, the computing device can be configured to take action before, during, and/or after the installation of a software update to help avoid situations that might otherwise render the computing device inoperable. In particular, the computing device can be configured to identify a file system volume to which the software update corresponds—e.g., an operating system (OS) file system volume when an OS software update is received—and generate a snapshot of the file system volume that captures a representation of the file system volume at the current point in time (i.e., prior to the software update). Next, the computing device can instantiate an operability monitor in conjunction with processing the software update, where the operability monitor is tasked with determining whether the computing device remains in an operable state during the software update. For example, the operability monitor can execute in isolation from the software update and identify failure scenarios that render the computing device inoperable, e.g., when the computing device freezes during/after the update, when software incompatibilities arise during/ after the update, when the computing device is unable to boot/login a user after the update, and so on.

Moreover, the operability monitor can identify situations where the computing device ultimately becomes inoperable despite the software update appearing to be successful. This can occur, for example, when the computing device is restarted after a software update and experiences inoperability conditions, e.g., the inability to reach a login screen, the inability to move past the login screen when valid credentials are provided, and so on. To effectively identify such inoperability conditions, the techniques described herein can involve establishing a notation (e.g., using a flag) in conjunction with installing the software update, where the notation causes the computing device to load the operability monitor subsequent to the software update (e.g., when the computing device restarts) to ensure that the computing device is fully operable.

In any case, when the operability monitor determines that the computing device enters into an inoperable state as a consequence of the software update, the operability monitor can cause the computing device to enter into a restoration mode. According to some embodiments, while in the restoration mode, the computing device can utilize the snapshot (generated prior to processing the software update) to restore the file system volume to its previous/operable state. In turn, the computing device can take the appropriate steps (e.g., restart) to properly boot and enter into an operable state, thereby mitigating the failures caused by the software update.

A more detailed discussion of these techniques is set forth below and described in conjunction with FIGS. 1-4, which illustrate detailed diagrams of systems and methods that can be used to implement these techniques.

FIG. 1 illustrates a block diagram 100 of different components of a computing device 102 that is configured to implement the various techniques described herein, according to some embodiments. More specifically, FIG. 1 illustrates a high-level overview of the computing device 102, which, as shown, can include at least one processor 104, at least one memory 106, and at least one storage device 114. According to some embodiments, the processor 104 can be configured to work in conjunction with the memory 106 and the storage device 114 to enable the computing device 102 to implement the various techniques set forth in this disclosure. According to some embodiments, the storage device 114 can represent a storage that is accessible to the computing device 102, e.g., a hard disk drive, a solid-state drive, a mass storage device, a remote storage device, and the like.

As shown in FIG. 1, the storage device 114 can be configured to store the data of different file system volumes that can be mounted at the computing device 102. For example, the processor 104 can be configured to mount an operating system (OS) file system volume 116 on the computing device 102, where the OS file system volume 116 includes an OS 108 that is compatible with the computing device 102. According to some embodiments, the OS 108 can enable both a file system volume manager 110 and an operability monitor 112 to execute on the computing device 102. As is well-understood, the OS 108 can also enable a variety of processes to execute on the computing device 102, e.g., OS daemons, native OS applications, user applications, and the like. According to some embodiments, the OS file system volume 116 can also include user data that is accessible at the computing device 102 by way of the OS 108. However, it is noted that, in some configurations, such user data can instead be stored in a separate file system volume that can be concurrently mounted on the computing device 102 and accessible to the OS 108. According to some embodiments, the file system volumes can be members of a same (or different) logical container and can be configured to utilize the same physical storage space within the storage device 114. This beneficially provides enhanced flexibility as each file system volume can consume space within the storage device 114 on an as-needed basis. In addition, each file system volume can be configured to enforce particular configurations (e.g., permissions, ownership, encryption schemes, etc.) that are independent from the configurations of other file system volumes managed by the computing device 102.

According to some embodiments, the storage device 114 can also be configured to store snapshots 120 of file system volumes of the computing device 102, where each snapshot 120 includes data that can be used to restore a particular file system volume to a particular point in time. According to some embodiments, and as described in greater detail herein, the file system volume manager 110 can be configured to service requests for generating snapshots 120 of the file system volumes. In particular, the file system volume manager 110 can be configured to gather data of a file system volume, generate a snapshot 120 based on the data, and then provide the snapshot 120 to the storage device 114 (or other storage device accessible to the computing device 102). For example, when a request for a first (i.e., an initial) snapshot 120 of a file system volume is received, the file system volume manager 110 can respond by creating a first snapshot 120 of the file system volume. Because this is an initial snapshot 120, no existing/prior snapshots 120 are associated with the file system volume, and it is not necessary for the file system volume manager 110 to rely on analyzing a previous snapshot 120 (i.e., to identify changes) when gathering data to generate the first snapshot 120. Instead, the file system volume manager 110 gathers the data—e.g., all of the data, or a subset of the data, depending on a configuration—and generates the first snapshot 120 for the file system volume.

According to some embodiments, the file system volume manager 110 can also establish various data structures that enable the file system volume manager 110 to efficiently identify any changes made to the file system volume subsequent to creating the first snapshot 120 (e.g., when a software update is processed), which can help increase efficiency when generating subsequent snapshots 120. At a later time, the file system volume manager 110 can receive a subsequent request to generate a second snapshot 120 of the file system volume. In response, the file system volume manager 110 can (1) identify the first snapshot 120 associated with the file system volume, (2) identify the data structures associated with the first snapshot 120, and (3) generate a second snapshot 120 that captures the changes represented in the data structures associated with the first snapshot 120.

According to some embodiments, the operability monitor 112 can be instantiated in conjunction with processing a software update, where the operability monitor 112 is tasked with determining whether the computing device 102 remains in an operable state during and/or after the software update. For example, the operability monitor 112 can execute in conjunction with the installation of the software update and identify failure scenarios that render the computing device 102 inoperable. The operability monitor 112 can also identify situations where the computing device 102 ultimately becomes inoperable despite the software update appearing to be successful. This can occur, for example, when the computing device 102 is restarted after a software update and inoperability conditions are encountered. According to some embodiments, when the operability monitor 112 determines that the computing device 102 enters into an inoperable state as a consequence of the software update, the operability monitor 112 can cause the computing device 102 to enter into a restoration mode. In particular, the storage device 114 can be configured to store a recovery OS file system volume 118 that, when mounted, enables a recovery OS to execute on the computing device 102. According to some embodiments, the recovery OS can be configured to carry out a variety of recovery operations at the computing device 102, e.g., formatting the storage device 114, re-installing the OS 108, managing/restoring snapshots 120 of different file system volumes (e.g., the OS file system volume 116), executing various diagnostics, and so on.

Accordingly, FIG. 1 sets forth an overview of different components/entities that can be included in the computing device 102 to enable the embodiments described herein to be properly implemented. As described in greater detail below, these components can be utilized to restore the computing device 102 to an operable state when a software update renders the computing device 102 inoperable, thereby enhancing overall stability and performance.

Figure 2A:
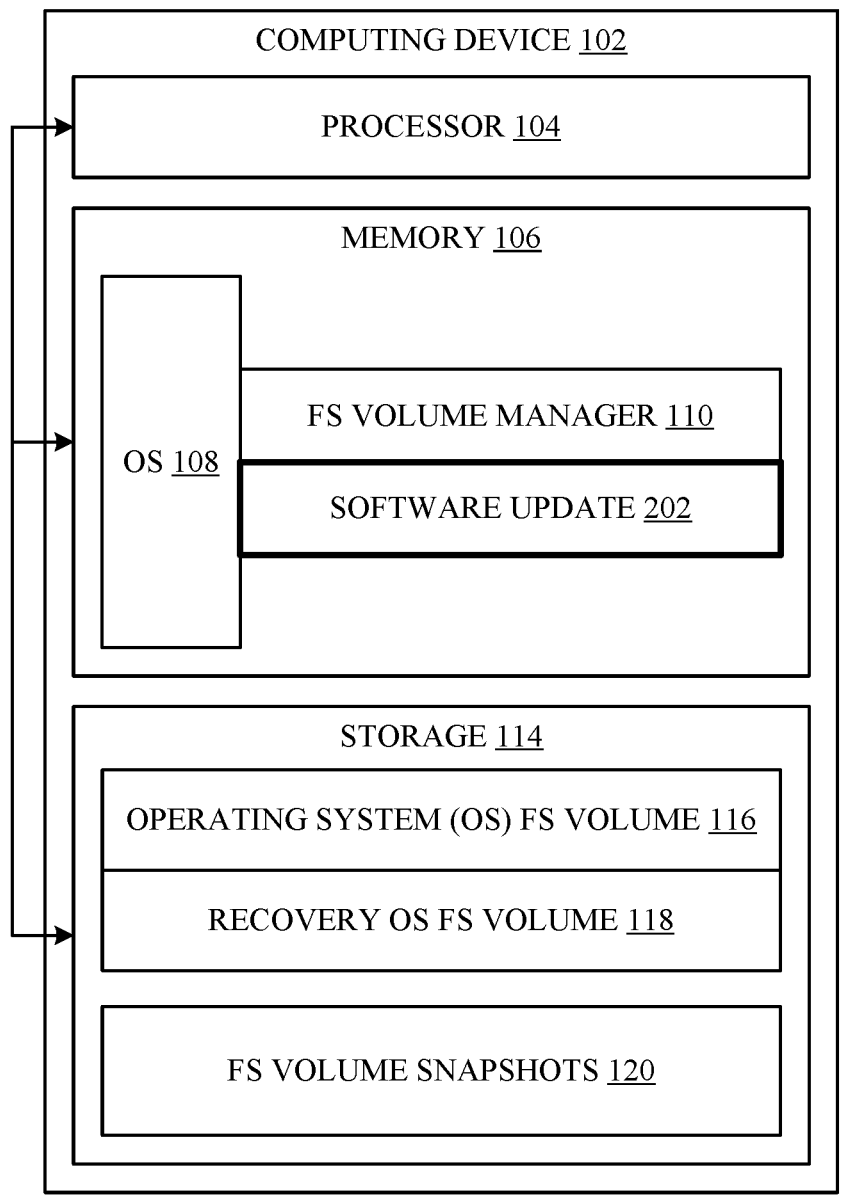
FIGS. 2A-2F illustrate conceptual diagrams of a computing device that self-restores to an operable state when a software update renders the computing device inoperable, according to some embodiments.

FIGS. 2A-2F illustrate conceptual diagrams of the computing device 102 self-restoring to an operable state when a software update renders the computing device 102 inoperable, according to some embodiments. As shown in FIG. 2A, a first step 210 can involve the computing device 102 receiving a software update 202 (e.g., via a download) for installation. In turn, the computing device 102 can load the software update 202 into the memory 106, and perform any associated tasks associated with preparing the software update 202 for installation (e.g., unpacking, verifying, etc.) at the computing device 102.

Figure 2B:
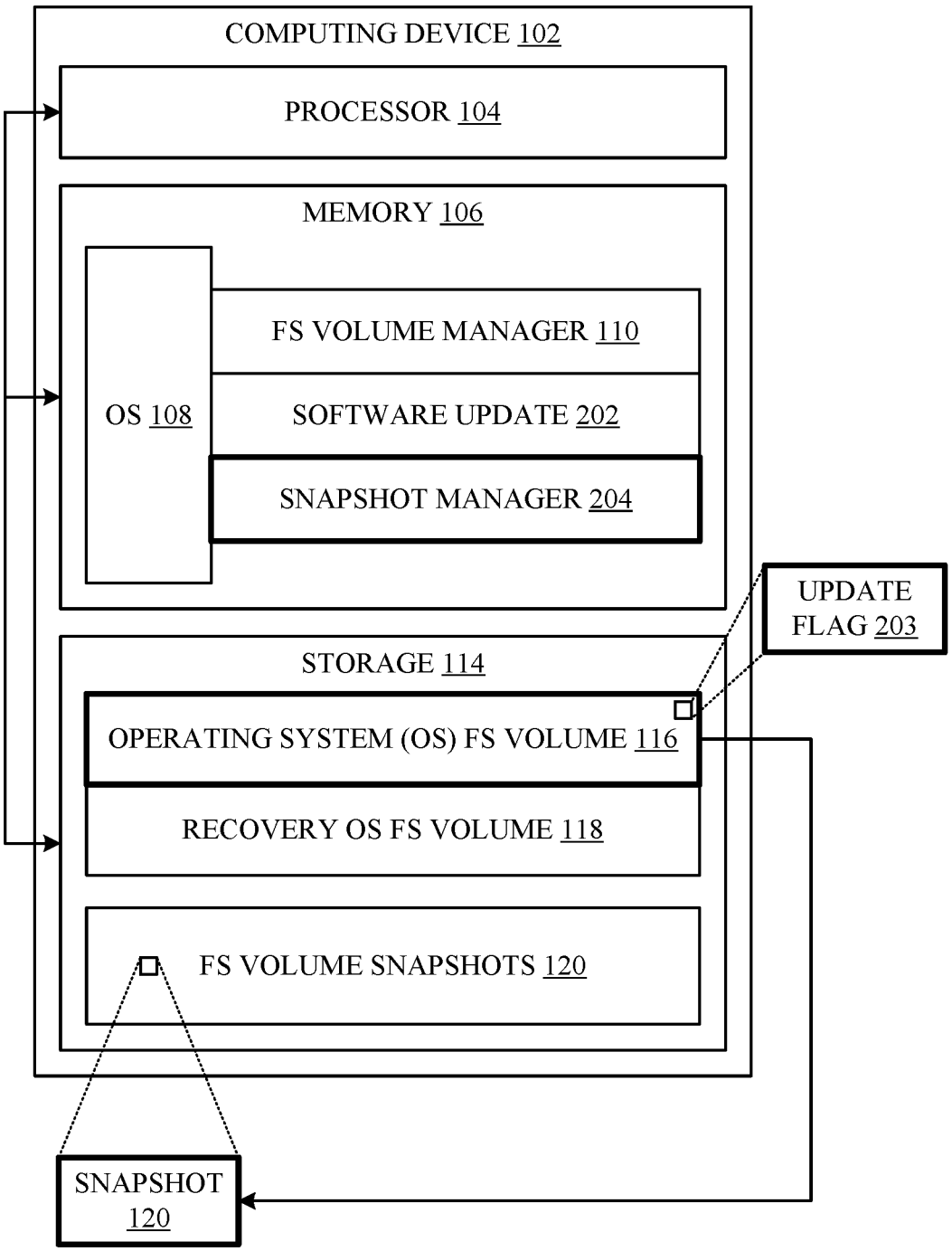

Turning to FIG. 2B, a second step 220 can involve the computing device 102 loading a snapshot manager 204 into the memory 106 (e.g., under the direction of the file system volume manager 110). According to some embodiments, and as shown in FIG. 2B, the snapshot manager 204 can be configured to generate a snapshot 120 of the OS file system volume 116. Again, this snapshot 120 includes data that enables the OS file system volume 116 to be restored to a state that corresponds to the time at which the snapshot 120 was taken, thereby enabling rollback procedures to be carried out when appropriate (as described herein). For example, when the snapshot 120 represents a first snapshot of the OS file system volume 116, the snapshot 120 can represent a complete copy of the OS file system volume 116. Continuing with this example, when the snapshot 120 represents a second snapshot of the OS file system volume 116 (i.e., taken after the first snapshot 120), the snapshot 120 can include a delta of the changes made to the OS file system volume 116 between the times at which the first snapshot 120 and the second snapshot 120 are taken. Additionally, step 220 can involve establishing an update flag 203 that provides an indication that the software update 202 is being processed or was recently processed. According to some embodiments, the update flag 203 can be implemented as a Boolean value that reflects whether a software update is being installed at the computing device 102. However, it is noted that the update flag 203 can be represented using other data types to represent multiple statuses of the software update. For example, the update flag 203 can be updated represent different milestones of the software update (e.g., a percentage completed, a number of segments successfully installed, etc.), thereby enabling a finer-level granularity of monitoring/responsiveness to be implemented. In this manner, the update flag 203 can be utilized to guide the operability monitor 112 during/after the update process to effectively identify and respond to scenarios in which the computing device 102 becomes inoperable.

Figure 2C:
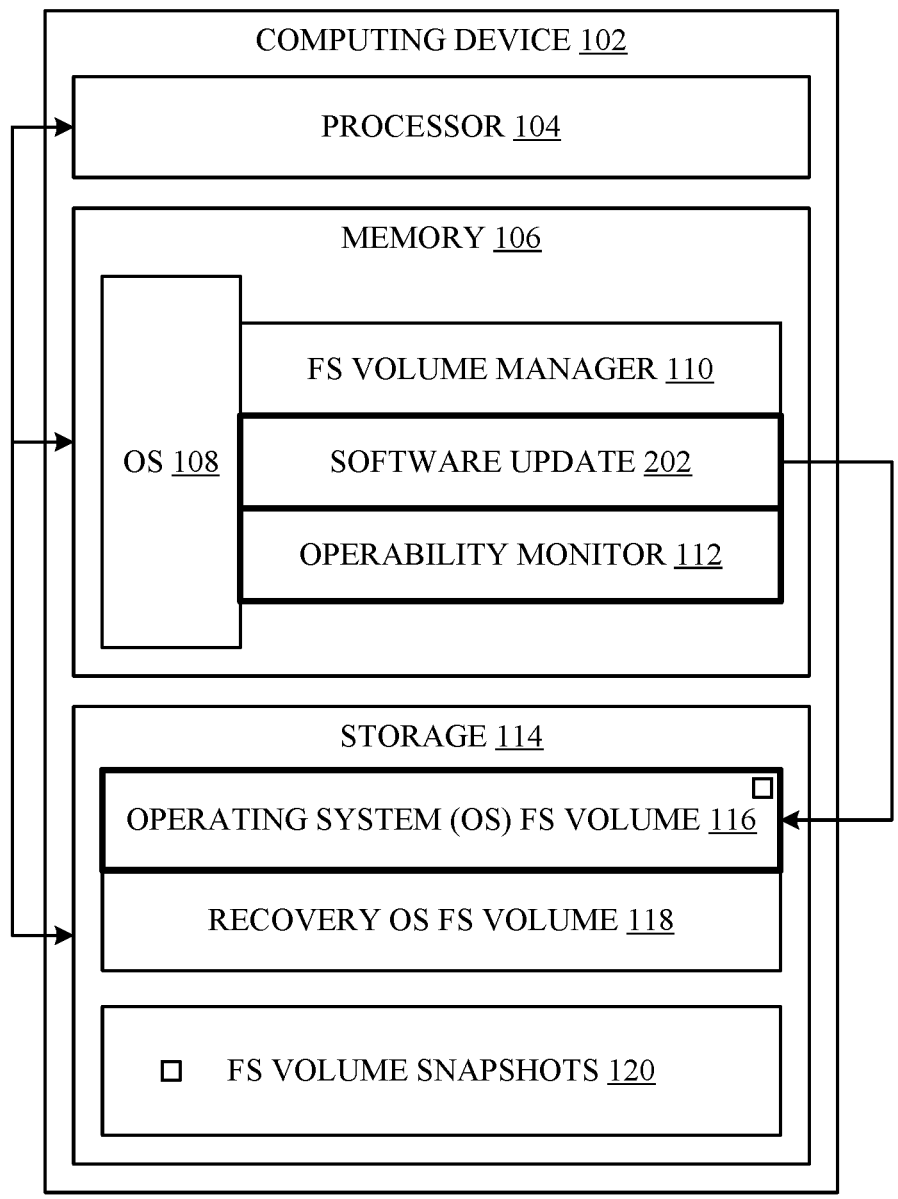

Turning now to FIG. 2C, a third step 230 can involve the computing device 102 instantiating the operability monitor 112 to effectively identify when the computing device 102 enters into an inoperable state (as a consequence of installing or attempting to install the software update). For example, the operability monitor 112 can identify when the computing device 102 encounters functionality issues when attempting to install the software update 202, e.g., when the software update 202 freezes, when auxiliary software processes fail, and so on. Moreover, the operability monitor 112 can identify when the computing device 102 encounters functionality issues after the software update 202 is installed. For example, the operability monitor 112 can automatically load when the computing device 102 reboots and the update flag 203 is identified. In turn, the operability monitor 112 can identify when issues are present, e.g., when the computing device 102 cannot reach a login screen, transition past a login screen, and so on. It is noted that the foregoing scenarios are exemplary, and that the operability monitor 112 can be customized to identify and respond to any number of conditions to effectively identify inoperability scenarios under which restorative action should be taken.

Figure 2D:
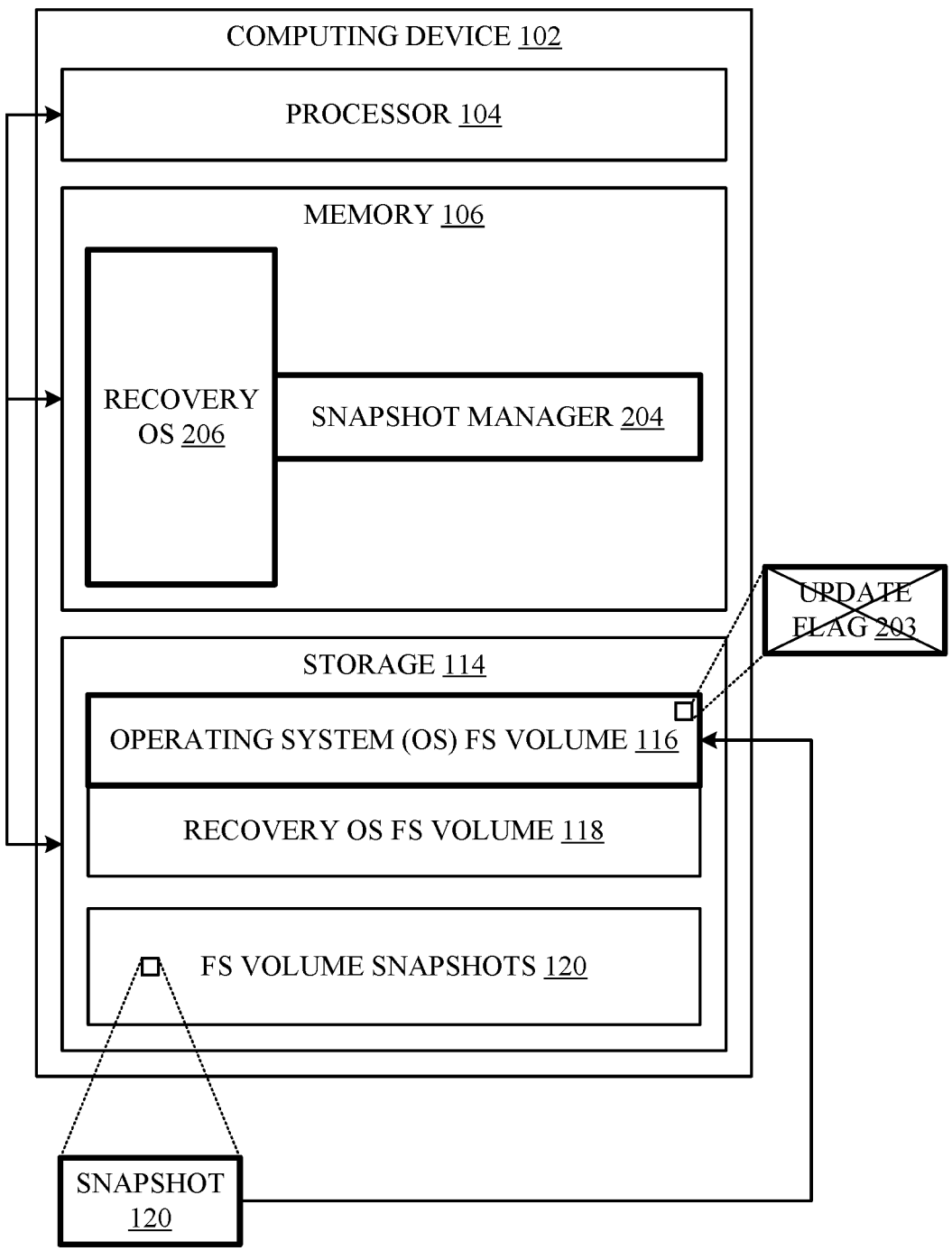

Turning now to FIG. 2D, a fourth step 240 can involve the computing device 102 rolling back the software update 202 in response to detecting the inoperability at step 230, as described above in conjunction with FIG. 2C. According to some embodiments, the operability monitor 112 can be configured to cause a recovery OS 206 to be executed. As previously described above, the recovery OS 206 can be accessed by mounting the recovery OS file system volume 118 at the computing device 102, which involves performing procedures that enable the contents of the recovery OS file system volume 118 to be accessible at the computing device 102. In this manner, the recovery OS 206 can enable the computing device 102 to carry out a variety of recovery operations, including restoring the OS file system volume 116 based on the snapshot 120 generated in conjunction with step 220 described in FIG. 2B. As shown in FIG. 2D, the recovery OS 206 can utilize the snapshot manager 204 to restore the OS file system volume 116 to the previous state the OS file system volume 116 was in when the snapshot 120 was generated. This can involve, for example, analyzing the snapshot 120 to identify differences between the snapshot 120 and a current state of the OS file system volume 116, and carrying out the appropriate updates to the OS file system volume 116 so that it reflects the snapshot 120. As a result, all changes to the OS file system volume 116 caused by the software update 202 are eliminated, thereby enabling the computing device 102 to effectively transition back into an operable state. Additionally, as shown in FIG. 2D, step 240 can also involve eliminating the update flag 203, as the computing device 102 can reliably expect to boot properly after the OS file system volume 116 is restored to a pre-software update 202 state. However, it is noted that this action is optional, and that the update flag 203 can remain intact to cause the operability monitor 112 to continue to monitor the computing device 102 for any potential lingering issues. For example, the update flag 203 can remain intact until at least one successful reboot and login is carried out at the computing device 102 to ensure that the computing device 102 is properly functioning.

Figure 2E:
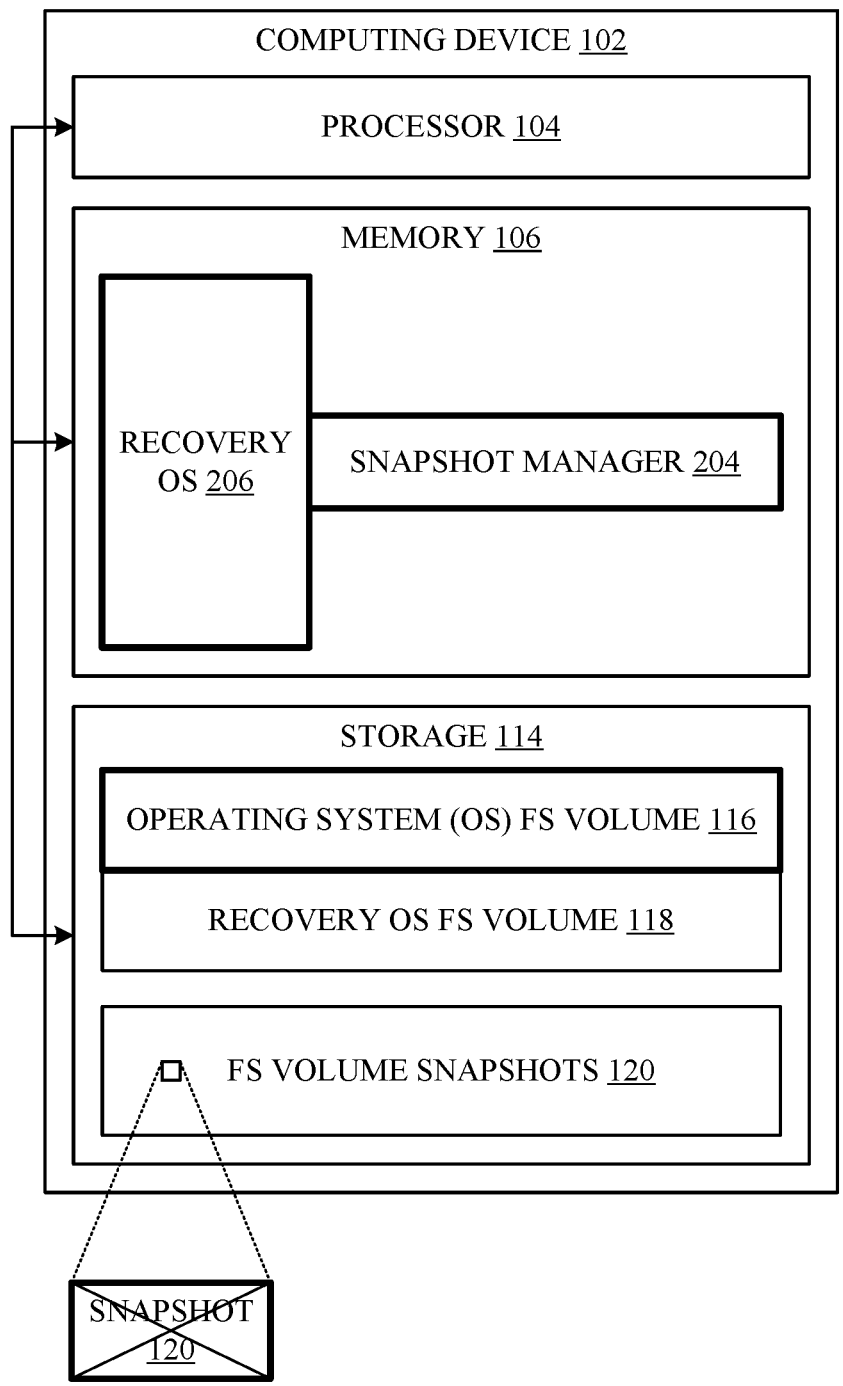

Turning now to FIG. 2E, a fifth step 250 can involve the computing device 102 performing optional cleanup procedures. For example, the fifth step 250 can involve the computing device 102 eliminating the snapshot 120 generated in conjunction with step 220 described in FIG. 2B. In particular, it is noted that the snapshot 120 may no longer be relevant to the computing device 102, as it is likely that the computing device 102 will not attempt to re-install the software update 202 that caused the inoperability issues in the first place. However, the computing device 102 can alternatively retain the snapshot 120 for future use when desired. For example, the computing device 102 can determine that a newer version of the software update 202 is available, and retain the snapshot 120 so that it is not necessary to re-generate a snapshot 120 of the OS file system volume 116 prior to attempting to install the newer version of the software update 202. Accordingly, the computing device 102 can be configured to employ any approach for retaining snapshots 120 that are generated in conjunction with attempting to install software updates 202. For example, the computing device 102 can take into account the amount of available space within the storage device 114, the processing resources available to the computing device 102, the size and complexity of the software updates 202, and so on.

Figure 2F:
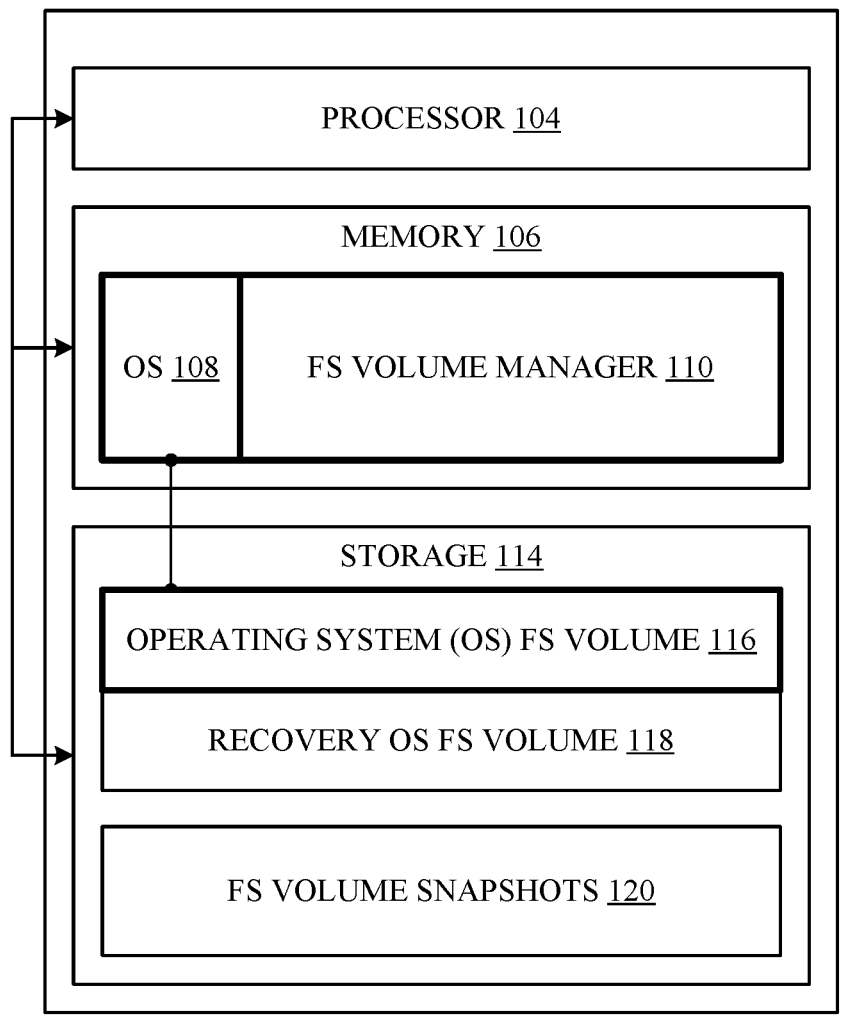

Finally, turning to FIG. 2F, a sixth step 260 can involve the computing device 102 rebooting into an operable state after OS file system volume 116 is restored based on the snapshot 120. As shown in FIG. 2F, the computing device 102 successfully loads the OS 108, where, in turn, a user of the computing device 102 can enter their login credentials and proceed to operate the computing device 102 as intended.

Accordingly, FIGS. 2A-2F illustrate a scenario under which the computing device 102 attempts to install a software update, becomes inoperable as a result, and then self-restores to an operable state using the operability monitor 112 and snapshot 120 functionalities described herein. In association with FIGS. 2A-2F, FIG. 3, which is described below in greater detail, provides a high-level breakdown of the techniques described herein.

Figure 3:
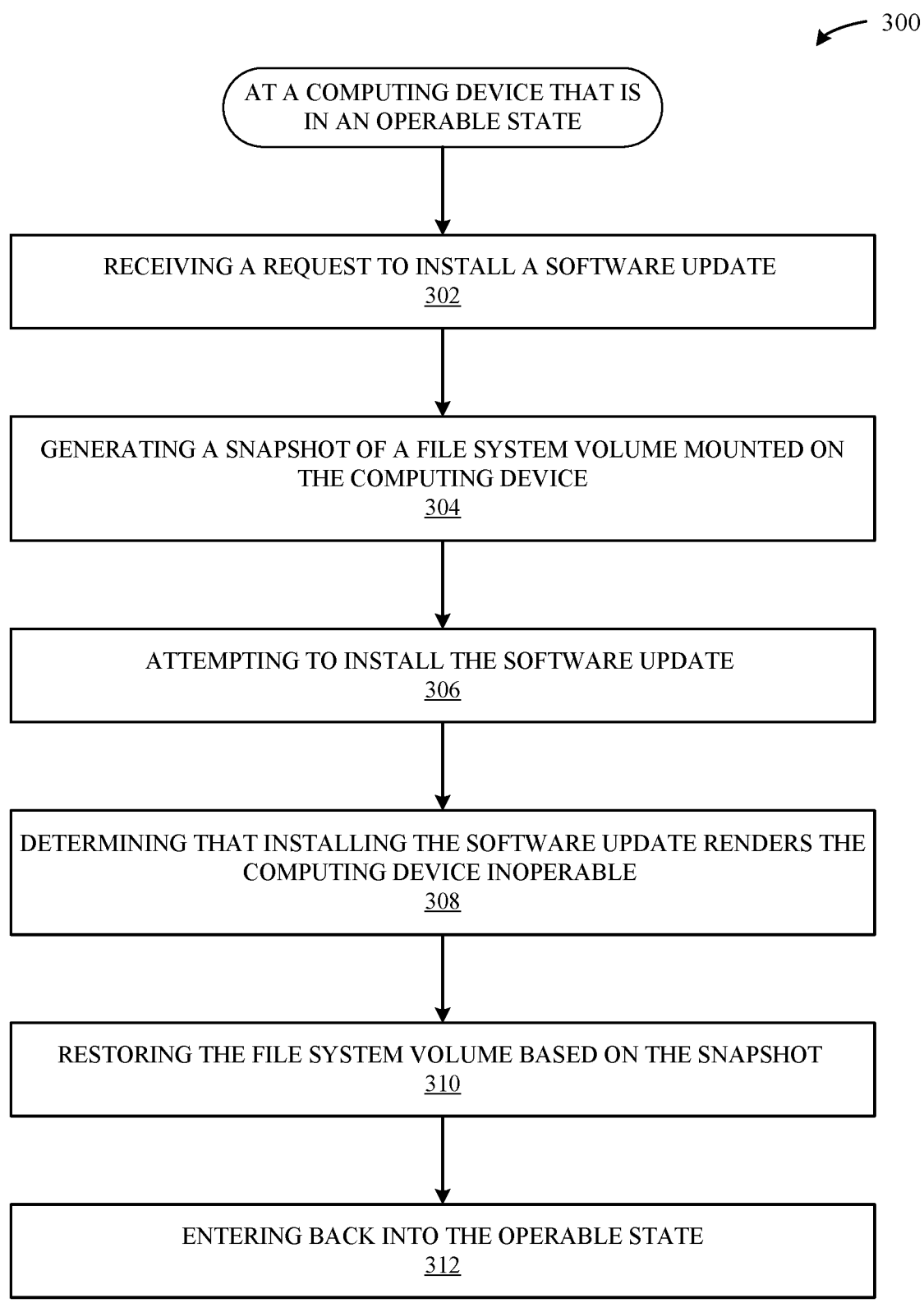
FIG. 3 illustrates a method for automatically restoring a computing device to an operable state when a software update renders the computing device inoperable, according to some embodiments.

FIG. 3 illustrates a method 300 for automatically restoring a computing device to an operable state when a software update renders the computing device inoperable, according to some embodiments. As shown in FIG. 3, the method 300 begins at step 302, where a computing device—e.g., the computing device 102 of FIG. 1—receives a request to install a software update. This can occur, for example, when a software update is downloaded to the computing device 102 (e.g., automatically, by a user, etc.) and prepared for installation at the computing device 102 (e.g., unpacked, verified, etc.).

At step 304, the computing device 102 generates a snapshot of a file system volume mounted on the computing device. As previously described above, the file system volume targeted by the snapshot can correspond to the software update that is received at step 302. For example, when the software update is directed to an OS file system volume (e.g., updating an OS included in the OS file system volume), the snapshot can capture the current state of the OS file system volume prior to the installation of the software update. In another example, when the software updated is directed to a user file system volume (e.g., updating a hierarchical organization), the snapshot can capture the current state of the user file system volume prior to the installation of the software update.

At step 306, the computing device 102 attempts to install the software update. As previously described herein, inoperability situations can arise during and/or after the installation of the software update. At step 308, the computing device 102 determines that installing the software update renders the computing device inoperable. For example, the operability monitor described herein can determine during or after the installation of the software update that the computing device 102 is experiencing some form of inoperability that the operability monitor deems unacceptable.

At step 310, the computing device 102 restores the file system volume based on the snapshot. Again, this can involve the computing device 102 entering into a state under which the file system volume can be restored based on the snapshot—e.g., under a recovery OS that can be loaded at the computing device 102—where, in turn, the computing device 102 restores the file system volume to a pre-software update state based on the snapshot. Finally, at step 312, the computing device 102 can enter back into the operable state that the computing device 102 was in prior to the software update. In turn, the computing device 102 can disregard the software update, attempt to re-install the software update or subsequent software updates, and so on.

Figure 4:
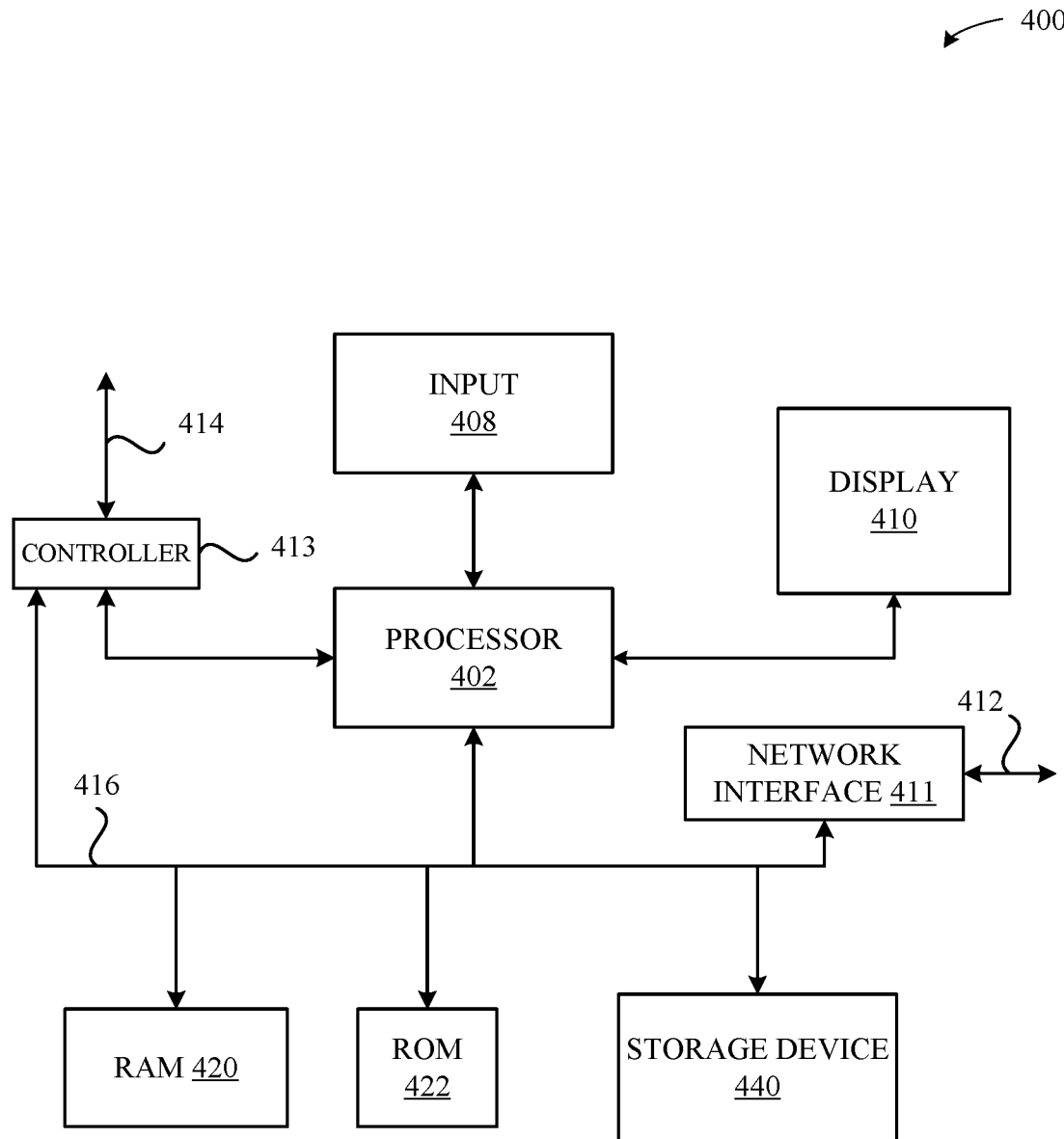
FIG. 4 illustrates a detailed view of components that can be included in the computing device illustrated in FIG. 1, according to some embodiments.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the file system volume manager 110, the operability monitor 112, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for restoring a computing device to an operable state in response to a software update that renders the computing device inoperable, the method comprising, at the computing device:
   receiving the software update;
   identifying a file system volume to which the software update corresponds;
   generating an update flag within the computing device;
   generating a snapshot of the file system volume;
   executing an installation of the software update;
   in response to detecting the installation of the software update, instantiating an operability monitor that executes in isolation from the software update, wherein the operability monitor is configured to:
      monitor the installation of the software update to determine whether the computing device remains operable during the software update; and
   in response to detecting the update flag during a reboot of the computing device:
      instantiating the operability monitor to identify whether the computing device is inoperable subsequent to the software update being installed, wherein, when the operability monitor identifies that the computing device is inoperable, the operability monitor causes the file system volume to be restored based on the snapshot.

2. The method of claim 1, wherein the software update comprises at least one of an operating system update, a device driver update, a firmware update, or a wireless carrier update.

3. The method of claim 1, wherein the update flag is generated prior to generating the snapshot of the file system volume.

4. The method of claim 1, further comprising, in response to identifying that the computing device is operable:
   removing the update flag from the computing device.

5. The method of claim 1, wherein the computing device is inoperable when an operating system on the computing device is unable to (1) load a user login screen, or (2) advance beyond the user login screen when valid login credentials are provided.

6. The method of claim 1, wherein restoring the file system volume based on the snapshot comprises:
   loading a recovery module that restores the file system volume based on the snapshot to cause all changes invoked from installing the software update to be eliminated within the file system volume.

7. The method of claim 1, wherein the computing device is inoperable when at least one of the following conditions is met:
   a power failure occurs at the computing device while installing of the software update that results in a corruption of the file system volume;
   an incompatibility exists between a current software version and the software update; or
   a bug is included in the software update.

8. The method of claim 1, wherein the snapshot of the file system volume is generated when the file system volume is mounted and is being utilized by the computing device.

9. At least one non-transitory computer readable storage medium configured to store instructions that, when executed by at least one processor included in a computing device, cause the computing device to self-restore to an operable state in response to a software update that renders the computing device inoperable, by carrying out steps that include:
   receiving the software update;
   identifying a file system volume to which the software update corresponds;
   generating an update flag within the computing device;
   generating a snapshot of the file system volume;
   executing an installation of the software update;
   in response to detecting the installation of the software update, instantiating an operability monitor that executes in isolation from the software update, wherein the operability monitor is configured to:
      monitor the installation of the software update to determine whether the computing device remains operable during the software update; and
   in response to detecting the update flag during a reboot of the computing device:
      instantiating the operability monitor to identify whether the computing device is inoperable subsequent to the software update being installed, wherein, when the operability monitor identifies that the computing device is inoperable, the operability monitor causes the file system volume to be restored based on the snapshot.

10. The at least one non-transitory computer readable storage medium of claim 9, wherein the software update comprises at least one of an operating system update, a device driver update, a firmware update, or a wireless carrier update.

11. The at least one non-transitory computer readable storage medium of claim 9, wherein the update flag is generated prior to generating the snapshot of the file system volume.

12. The at least one non-transitory computer readable storage medium of claim 9, wherein the steps further include, in response to identifying that the computing device is operable:
   removing the update flag from the computing device.

13. The at least one non-transitory computer readable storage medium of claim 9, wherein the computing device is inoperable when an operating system on the computing device is unable to (1) load a user login screen, or (2) advance beyond the user login screen when valid login credentials are provided.

14. The at least one non-transitory computer readable storage medium of claim 9, wherein restoring the file system volume based on the snapshot comprises:

loading a recovery module that restores the file system volume based on the snapshot to cause all changes invoked from installing the software update to be eliminated within the file system volume.

15. A computing device configured to self-restore to an operable state in response to determining that a software update renders the computing device inoperable, the computing device comprising:
- at least one processor; and
- at least one memory storing instructions that, when executed by the at least one processor, cause the computing device to:
  - receive the software update;
  - identify a file system volume to which the software update corresponds;
  - generate an update flag within the computing device;
  - generate a snapshot of the file system volume;
  - execute an installation of the software update;
  - in response to detecting the installation of the software update, instantiating an operability monitor that executes in isolation from the software update, wherein the operability monitor is configured to:
    - monitor the installation of the software update to determine whether the computing device remains operable during the software update; and
  - in response to detecting the update flag during a reboot of the computing device:
    - instantiate the operability monitor to identify whether the computing device is inoperable subsequent to the software update being installed, wherein, when the operability monitor identifies that the computing device is inoperable, the operability monitor causes the file system volume to be restored based on the snapshot.

16. The computing device of claim 15, wherein the software update comprises at least one of an operating system update, a device driver update, a firmware update, or a wireless carrier update.

17. The computing device of claim 15, wherein the update flag is generated prior to generating the snapshot of the file system volume.

18. The computing device of claim 15, wherein the at least one processor further causes the computing device to, in response to identifying that the computing device is operable:
- remove the update flag from the computing device.

19. The computing device of claim 15, wherein the computing device is inoperable when an operating system on the computing device is unable to (1) load a user login screen, or (2) advance beyond the user login screen when valid login credentials are provided.

20. The computing device of claim 15, wherein restoring the file system volume based on the snapshot comprises:
- loading a recovery module that restores the file system volume based on the snapshot to cause all changes invoked from installing the software update to be eliminated within the file system volume.

* * * * *